United States Patent
Jan et al.

(10) Patent No.: US 11,408,353 B2
(45) Date of Patent: Aug. 9, 2022

(54) AUXILIARY POWER UNIT WITH PLURAL SPOOL ASSEMBLY AND STARTER TRANSMISSION ARRANGEMENT

(71) Applicant: HONEYWELL INTERNATIONAL INC., Morris Plains, NJ (US)

(72) Inventors: David K Jan, Fountain Hills, AZ (US); Christopher Zollars, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 187 days.

(21) Appl. No.: 16/367,893

(22) Filed: Mar. 28, 2019

(65) Prior Publication Data
US 2020/0309036 A1 Oct. 1, 2020

(51) Int. Cl.
| | |
|---|---|
| *F02C 7/36* | (2006.01) |
| *F01D 15/10* | (2006.01) |
| *F02C 7/275* | (2006.01) |
| *F02C 7/32* | (2006.01) |
| *F02C 7/266* | (2006.01) |
| *F02C 7/268* | (2006.01) |
| *F02C 7/26* | (2006.01) |

(52) U.S. Cl.
CPC ............... *F02C 7/36* (2013.01); *F01D 15/10* (2013.01); *F02C 7/275* (2013.01); *F02C 7/32* (2013.01); *F02C 7/26* (2013.01); *F02C 7/266* (2013.01); *F02C 7/268* (2013.01); *F05D 2220/50* (2013.01); *F05D 2220/76* (2013.01)

(58) Field of Classification Search
CPC .. F02C 7/268; F02C 7/275; F02C 7/32; F02C 7/36
See application file for complete search history.

(56) References Cited

U.S. PATENT DOCUMENTS

| | | | |
|---|---|---|---|
| 2,663,994 A * | 12/1953 | Lombard | ................ F02C 7/275 60/788 |
| 2,908,189 A | 10/1959 | Parker et al. | |
| 5,309,029 A | 5/1994 | Gregory et al. | |
| 6,732,529 B2 | 5/2004 | Anderson | |
| 7,698,884 B2 | 4/2010 | Maguire et al. | |
| 7,973,422 B2 | 7/2011 | Colin et al. | |
| 8,169,100 B2 | 5/2012 | Dooley | |
| 8,500,583 B2 | 8/2013 | Goi et al. | |

(Continued)

FOREIGN PATENT DOCUMENTS

| | | |
|---|---|---|
| EP | 2320067 A2 | 5/2011 |
| EP | 2574759 A2 | 4/2013 |
| EP | 3354881 A1 | 8/2018 |

*Primary Examiner* — Katheryn A Malatek
*Assistant Examiner* — Alyson Joan Harrington
(74) *Attorney, Agent, or Firm* — Lorenz & Kopf, LLP

(57) ABSTRACT

A gas turbine engine includes a plural spool assembly including a first spool and a second spool. The engine also includes an accessory configured to change between a motor mode and a generator mode and a transmission configured to transmit mechanical power between the accessory and at least one of the first spool and the second spool. The transmission, when the accessory is in the generator mode, is configured to transmit mechanical power from the first spool to the accessory for generating electric power at the accessory. The transmission, when the accessory is in the motor mode, is configured to transmit mechanical power from the accessory to the second spool.

17 Claims, 2 Drawing Sheets

(56) References Cited

U.S. PATENT DOCUMENTS

| | | |
|---|---|---|
| 9,045,996 B2 | 6/2015 | Anghel et al. |
| 9,816,511 B2 | 11/2017 | Marcucci et al. |
| 10,041,412 B2 | 8/2018 | Dooley et al. |
| 2002/0011385 A1* | 1/2002 | Hayabuchi ............ F16D 55/40 188/82.1 |
| 2006/0005544 A1* | 1/2006 | Herlihy ................ F02C 7/36 60/772 |
| 2006/0254253 A1* | 11/2006 | Herlihy ................ F01D 15/10 60/39.162 |
| 2010/0005810 A1 | 1/2010 | Jarrell et al. |
| 2012/0000204 A1 | 1/2012 | Kesseli et al. |
| 2014/0147278 A1* | 5/2014 | Demolis ................ F01D 9/02 416/147 |
| 2014/0306460 A1 | 10/2014 | Donnelly |
| 2015/0377142 A1 | 12/2015 | Sheridan et al. |
| 2018/0087396 A1* | 3/2018 | van der Merwe ...... F01D 25/16 |
| 2018/0223740 A1 | 8/2018 | Forest et al. |
| 2019/0322382 A1* | 10/2019 | Mackin ................ B64D 27/24 |
| 2020/0130853 A1* | 4/2020 | Stuckey ................ F02C 7/36 |

\* cited by examiner

AUXILIARY POWER UNIT WITH PLURAL SPOOL ASSEMBLY AND STARTER TRANSMISSION ARRANGEMENT

TECHNICAL FIELD

The following relates to a gas turbine engine and, more particularly, relates to an auxiliary power unit with a plural spool assembly and a starter transmission arrangement.

BACKGROUND

Gas turbine engines are often included on vehicles, such as aircraft. A gas turbine engine may be used for power generation for an aircraft. It is desirable for such systems to deliver high performance in a compact, lightweight configuration that is highly manufacturable.

Turboshaft turbine engines, such as those configured for auxiliary power units, can operate to produce mechanical power for rotating a shaft. This mechanical power may be transferred to an accessory drive (i.e., gearbox), and the accessory drive may include an accessory, such as a generator that generates electric power from the mechanical input.

In addition to the accessory and the associated accessory drive, some gas turbine engines also include an additional starter motor that inputs mechanical power into the turboshaft turbine engine. To start the engine, the starter motor initially drives rotation of a turbine engine shaft, and then the internal combustion process eventually sustains operations of the gas turbine engine. However, the extra starter motor and its respective drive train adds complexity to the system, increases part count, takes up significant physical space, and increases weight.

Accordingly, there is a need for a gas turbine engine, such as a turboshaft turbine engine, that includes an on-board starter that is compact, robust, and reliable. There is a need for an engine of this type that is also lightweight and that has a relatively low part count. Furthermore, there is a need for such a gas turbine engine that is relatively simple to manufacture. Furthermore, other desirable features and characteristics of the present disclosure will become apparent from the subsequent detailed description and the appended claims, taken in conjunction with the accompanying drawings and this background section.

BRIEF SUMMARY

In one embodiment, a gas turbine engine is disclosed that includes a support structure and a plural spool assembly supported for rotation about an axis by the support structure. The plural spool assembly includes a first spool and a second spool. The gas turbine engine further includes an accessory supported by the support structure. The accessory is configured to change between a motor mode and a generator mode. Also, the gas turbine engine includes a transmission configured to transmit mechanical power between the accessory and at least one of the first spool and the second spool. The transmission, when the accessory is in the generator mode, is configured to transmit mechanical power from the first spool to the accessory for generating electric power at the accessory. The transmission, when the accessory is in the motor mode, is configured to transmit mechanical power from the accessory to the second spool.

In another embodiment, a gas turbine auxiliary power unit (APU) is disclosed that includes a support structure and a dual spool assembly supported for rotation about an axis by the support structure. The dual spool assembly includes a first spool and a second spool. The gas turbine APU also includes an accessory supported by the support structure. Furthermore, the gas turbine APU includes an accessory drive that operably couples the accessory and the dual spool assembly for power transmission therebetween. The accessory drive has a first transmission arrangement and a second transmission arrangement. The first transmission arrangement operably couples the first spool and the accessory for power transmission from the first spool to the accessory. The second transmission arrangement operably couples the accessory and the second spool for power transmission from the accessory to the second spool. The second transmission arrangement also has a selective drive unit configured to move between an engaged position and a disengaged position. The selective drive unit, in the engaged position, couples the first spool and the second spool for power transmission from the accessory, to the first spool, and then to the second spool. The selective drive unit, in the disengaged position, decouples the first spool and the second spool and allows power transmission from the first spool to the accessory.

In an additional embodiment a method of manufacturing a gas turbine engine is disclosed. The method includes providing a support structure and installing a plural spool assembly within the support structure including supporting the plural spool assembly for rotation about an axis by the support structure. The plural spool assembly includes a first spool and a second spool. The method includes supporting an accessory with the support structure. The accessory is configured to change between a motor mode and a generator mode. The method also includes attaching an accessory drive to the accessory and the plural spool assembly. The accessory drive is configured to transmit mechanical power between the accessory and at least one of the first spool and the second spool. The transmission, when the accessory is in the generator mode, is configured to transmit mechanical power from the first spool to the accessory for generating electric power at the accessory. The transmission, when the accessory is in the motor mode, is configured to transmit mechanical power from the accessory to the second spool.

Furthermore, other desirable features and characteristics of the present disclosure will become apparent from the above background, the subsequent detailed description, and the appended claims, taken in conjunction with the accompanying drawings.

DETAILED DESCRIPTION

Figure 1:
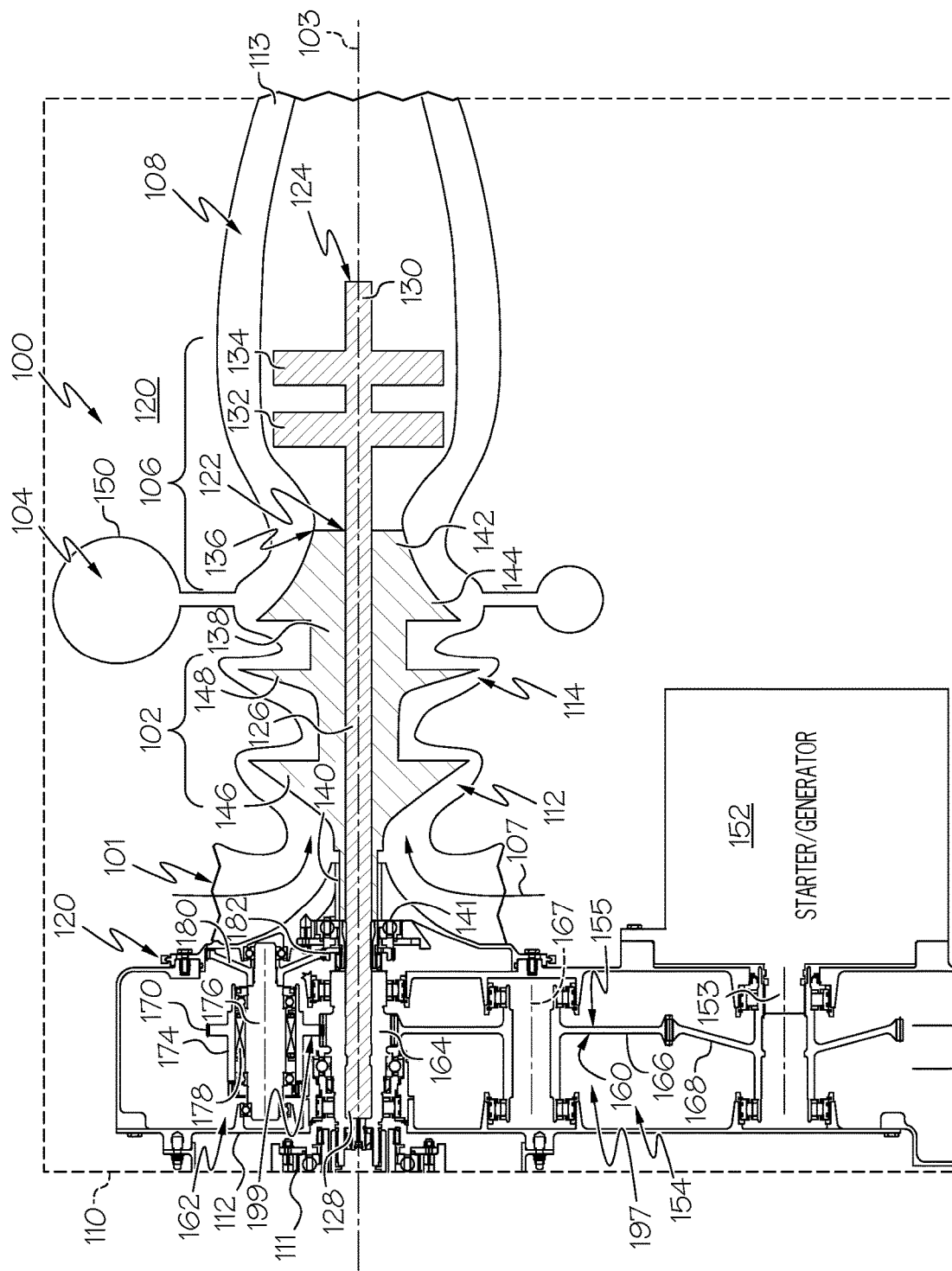
FIG. 1 is a partial schematic axial cross-sectional view of a gas turbine engine according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

In the discussion below, various example configurations of shafts, gears, bearings, clutches, and other transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

The present disclosure provides an advanced turboshaft gas turbine engine and may be configured as an auxiliary power unit for a vehicle. The engine may have a plural-spool architecture. In some embodiments, the engine may be a two-spool turboshaft engine. This configuration provides high overall pressure ratios for increased cycle efficiency during operation as well as other benefits.

In some embodiments, the gas turbine engine of the present disclosure may include a first spool (i.e., a power turbine (PT) spool) with a first shaft and one or more power turbines supported thereon. The engine may also include a second spool (i.e., a high pressure (HP) spool) with a second shaft, and compressor(s) and turbine(s) supported thereon. The second spool may receive the first shaft and may be coaxial therewith.

During normal operations, the gas turbine engine produces power that rotates the PT shaft, which outputs mechanical power via an accessory drive to drive an accessory. The accessory may be an e-machine that converts the input mechanical power into electric power.

The accessory drive of the present disclosure may include a starter transmission arrangement that selectively engages the first and second spools. With the spools engaged, the accessory drive may transfer starting torque from the accessory to the second spool via the first spool.

The starter transmission arrangement may include a selective drive unit, such as a sprag clutch, for varying how power flows through the accessory drive during different operating modes. The clutch may be biased towards an engaged position (i.e., to engage the first and second spools) for starting the gas turbine engine. Once the engine has started and/or once the second shaft reaches a preset speed (e.g. 50% HP spool rpm), the sprag clutch may automatically disengage the two shafts, allowing the engine to operate normally.

Accordingly, the gas turbine engine may be very compact. A single e-machine may serve as both a generator and a starter for the dual spool gas turbine engine. The accessory drive and the starter arrangement are robust and reliable. The engine may have lightweight constructions. Also, the accessory drive may have a simple, elegant arrangement that is relatively easy to assemble and repair. The part count is relatively low, and other manufacturing efficiencies are provided.

Turning now to FIG. 1, an exemplary gas turbine engine 100 is depicted. The engine 100 may be included on a vehicle 110 of any suitable type, such as an aircraft, rotorcraft, marine vessel, train, or other vehicle.

The engine 100 may generally include an intake section 101, a compressor section 102, a combustion section 104, a turbine section 106, and an exhaust section 108, which are arranged generally along a longitudinal axis 103 between a forward end 111 and an aft end 113 of the engine 100. During operation, fluid flows generally downstream through the engine 100, along the axis 103 from the intake section 101 to the exhaust section 108.

More specifically, the intake section 101 may receive an intake airstream indicated by arrows 107 in FIG. 1. The compressor section 102, may include one or more compressor stages that draw air 107 downstream into the engine 100, compress the intake airstream 107, and raises its pressure. In the depicted embodiment, the compressor section 102 includes two stages: a low-pressure compressor stage 112 and a high-pressure compressor stage 114. The compressor stages 112, 114 may be disposed sequentially along the axis 103 with the low-pressure compressor stage 112 disposed upstream of the high-pressure compressor stage 114. It will be appreciated that the engine 100 could be configured with more or less than this number of compressor stages.

The compressed air from the compressor section 102 may be directed into the combustion section 104. In the combustion section 104, the compressed air from the compressor section 102 is mixed with fuel supplied from a non-illustrated fuel source. The fuel-and-air mixture is combusted in the combustion section 104, and the high energy combusted air mixture is then directed into the turbine section 106.

The turbine section 106 includes one or more turbine stages. No matter the particular number, the combusted air mixture from the combustion section 104 expands through the turbine section 106 to drivingly rotate a shaft 126. The combusted air mixture is then exhausted via the exhaust section 108.

In some embodiments, the engine 100 may be configured as a turboshaft gas turbine engine for producing mechanical power at the shaft 126 and harnessing this power to mechanically drive various devices within the engine 100 and/or within the vehicle 110. The engine 100 may include an accessory drive 154 (i.e., gearbox) that operably couples the shaft 126 to an accessory 152. The accessory 152 may be an electric machine (e-machine), such as a single-unit starter/generator. Accordingly, the accessory 152 may have a first mode (generator mode) in which the accessory 152 converts mechanical power input into electrical power. The accessory 152 may also have a second mode (motor mode) in which the accessory 152 outputs mechanical power and drives one or more components of the accessory drive 154.

Accordingly, the engine 100 may be configured as an auxiliary power unit (APU) for the aircraft 110 or another vehicle. Electric power from the accessory 152 may supply one or more other electrical devices onboard the aircraft 110. In some embodiments, which are represented in FIG. 1, the engine 100 may be a dual-spool gas turbine engine for an auxiliary power unit (APU). However, embodiments of the present disclosure are not limited to these types, but rather may be readily adapted for use in other types of turbine engines.

Figure 2:
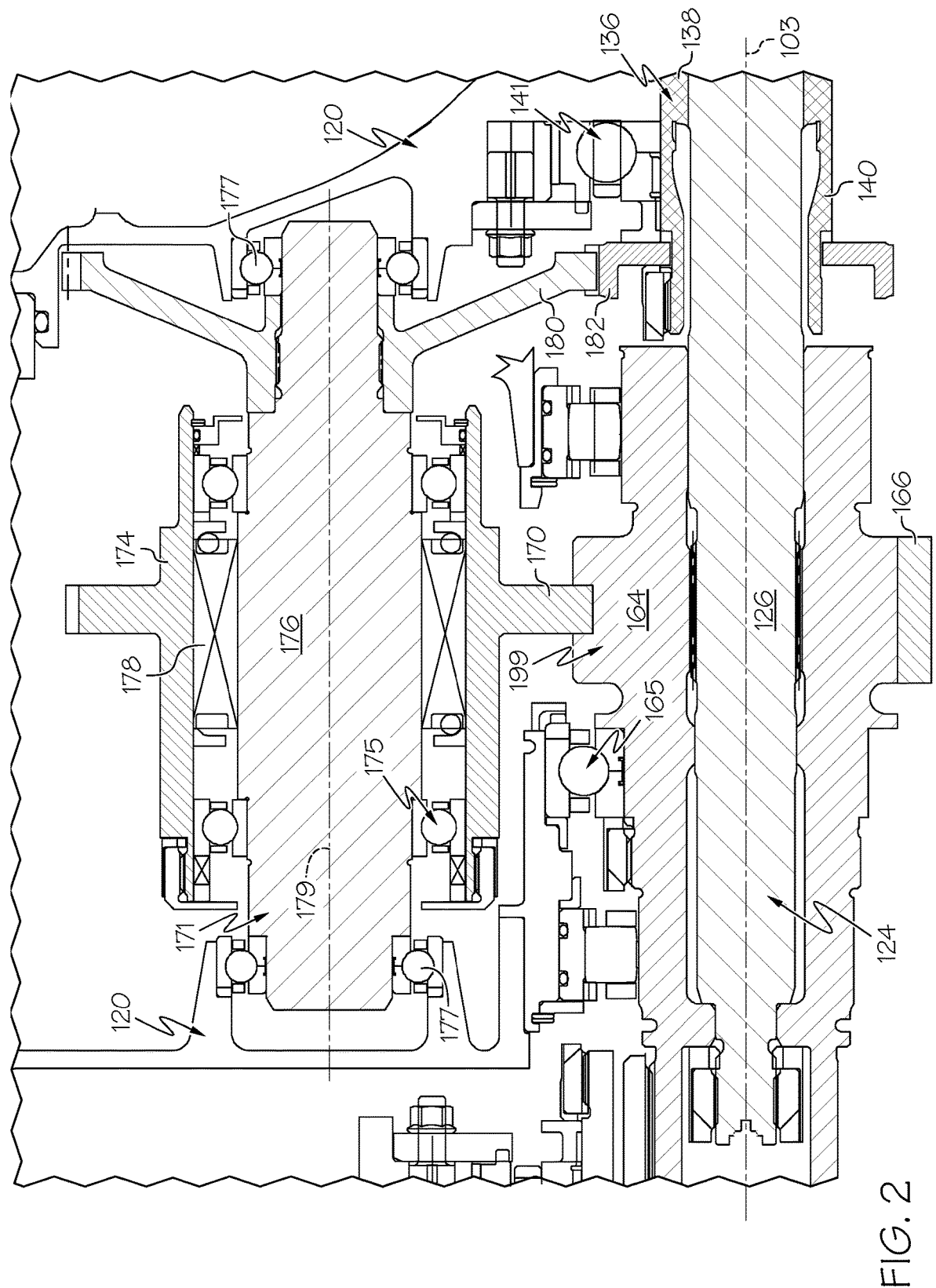
FIG. 2 is an axial cross-sectional view of a starter transmission arrangement of the gas turbine engine of FIG. 1.

Referring now to FIGS. 1 and 2, the engine 100 will be discussed in greater detail according to example embodiments of the present disclosure. As shown, the engine 100 may include a support structure 120, such as a chassis or frame structure of the vehicle 110. The support structure 120 may include a plurality of strong, stiff structures that support various moving parts within the engine 100.

The engine 100 may further include a plural spool assembly 122 that is supported for rotation about the axis 103 by the support structure. The spool assembly 122 may be have a two-spool (dual-spool) configuration. Accordingly, the spool assembly 122 may include a first spool 124 and a second spool 136.

The first spool 124 may include the shaft 126. For purposes of distinction, the shaft 126 will be referred to as "first shaft 126." The first shaft 126, in the configuration of FIG. 1 may be considered a "power shaft" or a "power turbine shaft." The first shaft 126 may be axially straight and centered on the axis 103. The first shaft 126 may include a first end 128 proximate the forward end 111 and a second end 130 proximate the aft end 113. The first shaft 126 may be supported for rotation about the axis 103 by the support structure 120 via one or more bearings that will be discussed in more detail below.

The first spool 124 may further include at least one turbine wheel. As shown in FIG. 1, for example, the first spool 124 may include a first stage turbine wheel 132 (i.e., first stage power turbine) and a second stage turbine wheel 134 (i.e., second stage power turbine). The first and second stage turbine wheels 132, 134 may be rotationally fixed on the shaft 126, proximate the second end 130, within the turbine section 106. The first stage turbine wheel 132 may be disposed upstream of the second stage turbine wheel 134.

The second spool 136 may include a second shaft 138. The second shaft 138 may be considered a "high pressure (HP) shaft" of the engine 100. The second shaft 138 may be hollow, may be axially straight, and may be centered on the axis 103. The second shaft 138 may include a first end 140 directed toward the forward end 111 and a second end 142 directed toward the aft end 113. The second shaft 138 may be supported for rotation about the axis 103 by the support structure 120 via one or more second shaft bearings 141, one of which is shown in FIGS. 1 and 2.

The second spool 136 may also include at least one turbine wheel 144 (i.e., high power turbine). The turbine wheel 144 may be a radial turbine wheel that is rotationally fixed on the second shaft 138 in the turbine section 106. Additionally, the second spool 136 may include at least one compressor wheel, such as a first compressor wheel 146 (i.e., low pressure compressor wheel) and a second compressor wheel 148 (high pressure compressor wheel). The first and second compressor wheels 146, 148 may be centrifugal compressor wheels. The first compressor wheel 146 and may be rotationally fixed on the second shaft 138 in the low-pressure compressor stage 112 of the engine 100, and the second compressor wheel 148 may be rotationally fixed on the second shaft in the high-pressure compressor stage 114 of the engine 100.

The second shaft 138 may receive the first shaft 126. As shown, the first end 128 of the first shaft 126 may protrude forward from the first end 140 of the shaft 138. Also, the second end 130 of the shaft 126 may protrude aft from the second end 142 of the shaft 138. As will be discussed, the first and second shafts 126, 138 may be supported for independent rotation at different angular speeds with respect to the axis 130. Also, the engine 100 may include features that selectively engage the shaft 126 of the first spool 124 to the shaft 138 of the second spool 136 such that the spools 124, 136 rotate together.

The combustion section 104 may include a scroll 150 that encircles the turbine wheel 144. The scroll 150 may be in fluid connection with the compressor section 102 and may receive compressed fluid therefrom. The scroll 150 may also be connected to an injector that injects fuel and a combustor that ignites the fuel-air mixture. The combusted air mixture from the scroll 150 expands over and drives the turbine 144 in rotation about the axis 103. The second shaft 138 and the compressor wheels 146, 148 are driven in rotation as a result. Furthermore, the energy of combustion drives rotation of the first and second stage turbine wheels 132, 134 of the first spool 124. The first shaft 126 is driven in rotation independent of the second shaft 138 as a result. Exhaust gas may exit the engine 100 via the exhaust section 108.

The accessory 152 may be an electric machine (e-machine) with an e-machine shaft 153. The accessory 152 may include a generator mode and may have, for example, a capacity between 100 kW and 200 kW. The accessory 152 may also have a motor mode for driving the shaft e-machine shaft 153 for outputting mechanical power therefrom. The accessory 152 may be supported by the support structure 120, proximate the forward end 111 of the engine 100. The e-machine shaft 153 may be substantially parallel and spaced apart at a distance from the axis of rotation 103 of the first and second shafts 126, 138.

The accessory drive 154 may include a transmission 155. The transmission 155 may include a plurality of gears, shafts, and other elements that are supported for rotation within the support structure 120 (i.e., within the gearbox). Different elements may be interconnected, enmeshed and arranged for transferring mechanical power through the accessory drive 154. The transmission 155 may be configured to transfer power between elements at a predetermined gear ratio. Elements of the transmission 155 and the arrangement(s) of these elements i.e., "transmission arrangement(s)" will be discussed in detail below. However, it will be appreciated that the transmission 155 may be configured differently without departing from the scope of the present disclosure.

The transmission 155 may include a first transmission arrangement 197, which operably couples the first shaft 126 of the first spool 124 to the e-machine shaft 153 of the accessory 152. Thus, the first transmission arrangement 197 is configured to transmit mechanical power therebetween. In some embodiments, the first transmission arrangement 197 is configured to transmit power from the first shaft 126 to the e-machine shaft 153 (to generate electric power at the accessory 152).

The first transmission arrangement may include a first gear train 160 having a series of interconnected gears arranged on substantially parallel shafts from the first shaft 126 to the e-machine shaft 153. These first gear train 160 may have a fixed train arrangement such that the first shaft 126 and the e-machine shaft 153 remain coupled for power transmission in both generator and motor modes of the accessory 152.

Beginning at the first shaft 126, the first gear train 160 may include a first shaft pinion 164 (i.e., a PT pinion). As shown in FIG. 2, the first shaft pinion 164 may receive the first shaft 126 and may be fixed for rotation thereon. The ends of the first shaft pinion 164 may also be supported for rotation on the support structure 120 by one or more first pinion bearings 165. Thus, the first shaft 126 may be supported for rotation on the support structure 120 via the first shaft pinion 164 and the first pinion bearings 165. An intermediate portion of the first shaft pinion 164 may include gear teeth that mesh with other members of the first gear train 160.

For example, as shown in FIG. 1, the first gear train 160 may also include an idler gear 166. The idler gear 166 may be a spur gear enmeshed with the gear teeth of the first shaft pinion 164. The idler gear 166 may be supported for rotation about an idler axis 167 that is parallel and spaced at a distance from the axis 103 of the spool assembly 122.

Additionally, the first gear train 160 may include an e-machine gear 168 that is enmeshed with the idler gear 166. The e-machine gear 168 may be a spur gear with a slightly frusto-conic shape. The e-machine gear 168 may be rotationally fixed to the e-machine shaft 153.

The accessory drive 154 may include a second transmission arrangement 199, which operably couples the accessory 152 to the second shaft 138 of the second spool 136. Thus, the second transmission arrangement 199 is configured to transmit mechanical power, for example, when the accessory 152 is in a motor mode and provides power to the second spool 136 for starting the engine 100.

In some embodiments, the second transmission arrangement 199 may include both the first gear train 160 and a second gear train 162. In some embodiments, power from the accessory 152 transmits through the second transmission arrangement 199, in series, from the first gear train 160, via the second gear train 162 to the second spool 136.

The first gear train 160 is described above and will not be repeated. In some embodiments, the second gear train 162 branches from the first gear train 160 to operably connect to the second shaft 138 of the second spool 136.

The second gear train 162 may include a series of interconnected gears arranged on substantially parallel shafts from the first shaft pinion 164 to the second spool 136. The second gear train 162 may also be referred to as a starter transmission arrangement because it enables power transmission for starting the gas turbine engine 100.

As shown in FIG. 2, the second gear train 162 may include a selective drive unit 171. The selective drive unit 171 may selectively couple and, alternately, decouple the first shaft 126 and the second shaft 138. In some embodiments, the selective drive unit 171 is a one-way free wheel clutch, such as a sprag clutch. Accordingly, the selective drive unit 171 may include an outer member 174, an inner member 176, and a plurality of roller elements 175 supporting therebetween. The selective drive unit 171 may also include one or more sprag elements 178 that allows freewheeling in one direction and that engages the inner member 176 and the outer member 174 in the opposite direction. In other words, the unit 171 may be configured to move between an engaged position and a disengaged position. The unit 171, in the engaged position, may couple the first spool 124 and the second spool 136 for power transmission from the first spool 124 to the second spool 136. The unit 171, in the disengaged position, decouples the first spool 124 and the second spool 136. The unit 171 may be biased toward the engaged position. The unit 171 may be configured to move from the engaged position to the disengaged position when the second spool 136 is rotating, at least, at a predetermined speed as will be discussed. As shown in FIG. 2, the ends of the inner member 176 may be supported for rotation about a clutch axis 179 on the support structure 120 by one or more clutch bearings 177. The clutch axis 179 may be parallel and spaced at a distance apart from the axis 103.

The second gear train 162 may also include an outer clutch gear 170 that is rotationally fixed to the outer member 174. The outer clutch gear 170 is also enmeshed with the first shaft pinion 164. As shown in FIGS. 1 and 2, the outer clutch gear 170 and the idler gear 166 may be disposed on opposite sides of the axis 103.

Furthermore, the second gear train 162 may include an inner clutch gear 180. The inner clutch gear 180 may be a spur gear having a frusto-conic shape in some embodiments. An inner diameter portion of the inner clutch gear 180 may be rotationally fixed to the inner member 176, and an outer diameter portion may include gear teeth.

Additionally, the second gear train 162 may include a second shaft pinion 182 (i.e., an HP pinion). The second shaft pinion 182 may be a spur gear rotationally fixed to the second shaft 138 proximate the end 140. The second shaft pinion 182 may be enmeshed with the inner clutch gear 180 as shown in FIG. 2.

Accordingly, during normal operations of the engine 100, the first transmission arrangement 197 (here, the first gear train 160) may transfer mechanical power from the first spool 124 to the accessory 152 for generating electric power. Power at the first shaft 126 may transfer via the first gear train 160 to the accessory 152. Specifically, power at the first shaft 126 may drive the first shaft pinion 164, which drives the idler gear 166, which drives the e-machine gear 168 for inputting mechanical power into the accessory 152. It will be appreciated that the second spool 136 may rotate during these operations causing rotation of the second shaft pinion 182, inner clutch gear 180 and inner member 176. However, the speed of the second spool 136 is such that the sprag elements 178 allow the inner member 176 to slip relative to the outer member 174. In other words, the selective drive unit 171 may remain in the disengaged position, thereby decoupling the first shaft 126 and the second shaft 138.

Alternatively, when starting the engine 100, the second transmission arrangement 199 may transfer mechanical power from the accessory 152 to the second spool 136. The selective drive unit 171 may remain biased in the engaged position. Also, mechanical power input from the accessory 152 may transfer from the e-machine gear 168 to the second shaft 138 of the second spool 136 via the first gear train 160 and the second gear train 162. Specifically, the accessory 152 may drivingly rotate the e-machine gear 168, which rotates the idler gear 166 for rotating the first shaft pinion 164. This, in turn, drivingly rotates the outer clutch gear 170 and the engaged outer member 174 and inner member 176 of the selective drive unit 171, thereby driving the inner clutch gear 180, which transfers power to the second shaft pinion 182 for power delivery to the second shaft 138. Once the second spool 136 is driven to a predetermined speed, the internal combustion process may proceed and the engine 100 may fully start. Once the second spool 136 achieves a predetermined speed, the sprag elements 178 may disengage, thereby decoupling the first and second spools 124, 136. In some embodiments, the sprag elements 178 may disengage when the angular speed of the second spool 136 corresponds to approximately half of second spool capacity (e.g. 50% HP spool rpm).

Accordingly, the gas turbine engine may be very compact. The accessory 152 may serve as both a generator and a starter motor for the dual spool gas turbine engine 100. This reduces weight and part count. The engine 100 is also simpler and more convenient to manufacture and repair. The accessory drive 154 is also robust and reliable.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

We claim:

1. A gas turbine engine comprising:
   a support structure;
   a plural spool assembly supported for rotation about an axis by the support structure, the plural spool assembly including a first spool and a second spool;
   an accessory supported by the support structure, the accessory configured to change between a motor mode and a generator mode; and
   a transmission configured to transmit mechanical power between the accessory and at least one of the first spool and the second spool, the transmission including a first transmission arrangement and a second transmission arrangement;
   the first transmission arrangement operably coupling the first spool and the accessory and, when the accessory is in the generator mode, configured to transmit mechanical power from the first spool to the accessory for generating electric power at the accessory;
   the second transmission arrangement operably coupling the second spool and the accessory and, when the accessory is in the motor mode, configured to transmit mechanical power from the accessory to the second spool;
   the first transmission arrangement including a first gear train from the first spool to the accessory, the first gear train terminating at a first end gear that is rotationally fixed to the first spool for rotation therewith, the second transmission arrangement including the first gear train and a second gear train arranged in series from the accessory to the second spool, the second gear train terminating at a second end gear that is rotationally fixed to the second spool and also terminating at a third end gear that is engaged with and that branches from the first end gear.

2. The gas turbine engine of claim 1, wherein the second gear train includes a selective drive unit configured to move between an engaged position and a disengaged position;
   wherein the selective drive unit, in the engaged position, couples the first spool and the second spool for power transmission from the first spool to the second spool; and
   wherein the selective drive unit, in the disengaged position, decouples the first spool and the second spool.

3. The gas turbine engine of claim 2, wherein the selective drive unit is biased toward the engaged position.

4. The gas turbine engine of claim 3, wherein the selective drive unit is a one-way free wheel clutch configured to move from the engaged position to the disengaged position when the second spool is rotating, at least, at a predetermined speed.

5. The gas turbine engine of claim 3, wherein the first spool includes a first shaft and a first turbine supported on the first shaft; and
   wherein the first end gear is rotationally fixed to the first shaft;
   wherein the selective drive unit includes an inner member, an outer member, and a sprag element disposed radially between the inner member and the outer member; and
   wherein, in the engaged position, the sprag element engages the inner member and the outer member and wherein, in the disengaged position, the sprag element disengages the inner member and the outer member;
   wherein the third end gear of the second gear train is an outer clutch gear that is fixed to the outer member; and
   wherein the outer clutch gear is enmeshed with the first end gear.

6. The gas turbine engine of claim 5, wherein the second spool includes a second shaft, a compressor wheel supported on the second shaft, and a second turbine supported on the second shaft;
   wherein the second shaft receives the first shaft and is coaxial therewith, the first and second shafts supported for independent rotation about the axis when the clutch is in the disengaged position.

7. The gas turbine engine of claim 1, wherein the gas turbine engine is configured as an auxiliary power unit of an aircraft.

8. A gas turbine auxiliary power unit (APU) comprising:
   a support structure;
   a dual spool assembly supported for rotation about an axis by the support structure, the dual spool assembly including a first spool and a second spool;
   an accessory supported by the support structure; and
   an accessory drive that operably couples the accessory and the dual spool assembly for power transmission therebetween;
   the accessory drive having a first transmission arrangement and a second transmission arrangement, the first transmission arrangement operably coupling the first spool and the accessory for power transmission from the first spool to the accessory, the second transmission arrangement operably coupling the accessory and the second spool for power transmission from the accessory to the second spool, the first transmission arrangement including a first gear train from the first spool to the accessory, the first gear train terminating at a first end gear that is rotationally fixed to the first spool for rotation therewith, the second transmission arrangement including the first gear train and a second gear train arranged in series from the accessory to the second spool, the second gear train terminating at a second end gear that is rotationally fixed to the second spool and also terminating at a third end gear that is engaged with and that branches from the first end gear;
   the second transmission arrangement having a selective drive unit configured to move between an engaged position and a disengaged position, the selective drive unit, in the engaged position, coupling the first spool and the second spool for power transmission from the accessory, to the first spool, and then to the second spool;
   wherein the selective drive unit, in the disengaged position, decouples the first spool and the second spool and allows power transmission from the first spool to the accessory; and
   wherein the first gear train has a fixed train arrangement such that the first spool and the accessory remain coupled for mechanical power transmission with the selective drive unit in both the engaged position and the disengaged position.

9. The gas turbine APU of claim 8, wherein the selective drive unit is biased toward the engaged position.

10. The gas turbine APU of claim 9, wherein the selective drive unit is a one-way free wheel clutch configured to move from the engaged position to the disengaged position when the second spool is rotating, at least, at a predetermined speed.

11. The gas turbine APU of claim 10, wherein the first spool includes a first shaft and a first turbine supported on the first shaft; and wherein the first end gear is rotationally fixed to the first shaft;

wherein the selective drive unit includes an inner member, an outer member, and a sprag element disposed radially between the inner member and the outer member; and wherein, in the engaged position, the sprag element engages the inner member and the outer member and wherein, in the disengaged position, the sprag element disengages the inner member and the outer member;

wherein the third end gear of the second gear train is an outer clutch gear that is fixed to the outer member; and wherein the outer clutch gear is enmeshed with the first end gear.

12. The gas turbine APU of claim 11, wherein the second spool includes a second shaft, a compressor wheel supported on the second shaft, and a second turbine supported on the second shaft;

wherein the second shaft receives the first shaft and is coaxial therewith, the first and second shafts supported for independent rotation about the axis when the clutch is in the disengaged position.

13. The gas turbine APU of claim 8, wherein the accessory, in a generator mode, is configured to convert mechanical power input by the first transmission arrangement into electric power; and wherein the accessory, in a motor mode, is configured to output mechanical power via the second transmission arrangement to the second spool for starting the gas turbine APU.

14. The gas turbine APU of claim 8, wherein the first spool and the second spool are coaxial on a first axis;

wherein the accessory has an accessory shaft supported for rotation about a second axis;

wherein the selective drive unit is supported for rotation about a third axis;

wherein the first axis, the second, and the third axis are parallel and separated at a distance.

15. The gas turbine APU of claim 8, wherein the first spool includes a first shaft and wherein the first end gear is rotationally fixed on the first shaft;

wherein the selective drive unit includes an outer member, an inner member, and a bearing element between the outer and inner members; and wherein the third end gear of the second gear train is an outer gear of the outer member, the outer gear being enmeshed with the first end gear.

16. The gas turbine APU of claim 15, wherein the second spool includes a second shaft;

wherein the second end gear is a second shaft pinion that is rotationally fixed to the second shaft;

wherein the second transmission arrangement operably couples the inner member and the second shaft pinion.

17. The gas turbine engine of claim 1, wherein the first gear train has a fixed train arrangement such that the first spool and the accessory remain coupled for mechanical power transmission both when the accessory is in the generator mode and is in the motor mode.

* * * * *